(12) United States Patent
Balasubramanian et al.

(10) Patent No.: US 7,809,702 B2
(45) Date of Patent: Oct. 5, 2010

(54) GENERATING FROM APPLICATION MODIFICATIONS COMMANDS TO MODIFY THE OBJECTS IN A REPOSITORY

(75) Inventors: Gopalakrishnan Balasubramanian, Sunnyvale, CA (US); Travis Eli Nelson, Campbell, CA (US); Suraksha Vidyarthi, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 11/745,860

(22) Filed: May 8, 2007

(65) Prior Publication Data

US 2008/0281862 A1  Nov. 13, 2008

(51) Int. Cl.
G06F 17/30 (2006.01)
(52) U.S. Cl. ...................................... 707/702
(58) Field of Classification Search .................. None
See application file for complete search history.

(56) References Cited

U.S. PATENT DOCUMENTS

| | | | |
|---|---|---|---|
| 5,873,075 A * | 2/1999 | Cochrane et al. ............... 707/2 |
| 6,453,314 B1 * | 9/2002 | Chan et al. ...................... 707/3 |
| 6,499,036 B1 | 12/2002 | Gurevich .................... 707/103 |
| 6,651,243 B1 | 11/2003 | Berry et al. |
| 6,654,753 B1 | 11/2003 | Arda et al. |
| 6,658,428 B2 * | 12/2003 | Sokol et al. .............. 707/103 R |
| 6,665,662 B1 | 12/2003 | Kirkwood et al. .............. 707/3 |
| 6,711,624 B1 | 3/2004 | Narurkar et al. ............ 709/321 |
| 6,867,782 B2 | 3/2005 | Gaudette et al. |
| 6,883,170 B1 | 4/2005 | Garcia |
| 6,924,821 B2 | 8/2005 | Trinh et al. |

(Continued)

FOREIGN PATENT DOCUMENTS

EP 1117049 7/2001

(Continued)

OTHER PUBLICATIONS

ICS Technical Support Services, "Stored Procedures", ICS Support Oct. 2001, htttb://web.archive.org/web/20011005162453/http://www.ics.com/support/docs/dx/1.5/stored.html, ICS Support, Oct. 5, 2001. accessed Sep. 11, 2007, Sep. 14, 2007.

(Continued)

*Primary Examiner*—Neveen Abel Jalil
*Assistant Examiner*—Kevin Young
(74) *Attorney, Agent, or Firm*—Kunzler Needham Massey & Thorpe

(57) ABSTRACT

Provided are a method, system, and article of manufacture for generating from application modifications commands to modify the objects in a repository. An input object including an update to at least one of a plurality of objects in a repository object is received. At least one maintain property associated with at least one of the objects is received. The at least one maintain property indicates whether to maintain the at least one object associated with the maintain property in the repository object that is not indicated in the input object. A determination is made of an object in the repository object that are not indicated in the input object. For the determined object, the maintain property associated with the determined object is used to determine whether to maintain the determined object in the repository object.

27 Claims, 5 Drawing Sheets

U.S. PATENT DOCUMENTS

| | | | |
|---|---|---|---|
| 7,111,194 B1 | 9/2006 | Schoenthal et al. | |
| 7,155,440 B1 | 12/2006 | Kronmiller et al. | |
| 7,197,512 B2 | 3/2007 | Pharies et al. | 707/103 |
| 7,412,455 B2 * | 8/2008 | Dillon | 707/102 |
| 7,457,817 B2 * | 11/2008 | Krishnaswamy et al. | 707/102 |
| 7,603,366 B1 * | 10/2009 | Gritsay et al. | 1/1 |
| 2002/0147731 A1 | 10/2002 | Seestrom et al. | 707/104.1 |
| 2003/0101169 A1 | 5/2003 | Bhatt et al. | |
| 2003/0101194 A1 | 5/2003 | Rys et al. | |
| 2003/0177114 A1 | 9/2003 | Lin et al. | |
| 2003/0195765 A1 | 10/2003 | Sehga et al. | 705/1 |
| 2004/0083222 A1 | 4/2004 | Pecherer | |
| 2004/0117513 A1 | 6/2004 | Scott | 710/1 |
| 2004/0199577 A1 | 10/2004 | Burd et al. | |
| 2005/0027732 A1 | 2/2005 | Kalima | |
| 2005/0080755 A1 | 4/2005 | Aoyama | 707/1 |
| 2005/0091252 A1 | 4/2005 | Liebich et al. | |
| 2005/0131964 A1 | 6/2005 | Saxena | |
| 2005/0171966 A1 | 8/2005 | Rath et al. | 707/101 |
| 2005/0246435 A1 | 11/2005 | Choudhary et al. | 709/223 |
| 2006/0056301 A1 | 3/2006 | Soncodi | |
| 2006/0059496 A1 | 3/2006 | Joy et al. | |
| 2006/0095288 A1 | 5/2006 | Amys et al. | 705/1 |
| 2006/0259909 A1 | 11/2006 | Passero et al. | 719/312 |
| 2006/0282439 A1 * | 12/2006 | Allen et al. | 707/100 |
| 2007/0016915 A1 | 1/2007 | Mukundan et al. | 719/330 |

FOREIGN PATENT DOCUMENTS

WO     WO9915979     4/1999

OTHER PUBLICATIONS

Welcome to the IBM WebSphere® Host Access Trandformation Services (HATS) V6 Information Center, http://publib.boulder.ibm.com/infocenter/hatshelp/v60/index.jsp?topic=/com.ibm.hats.doc/common_swg/welcome_template/websphere/WebSphereHats.htm accessed Jul. 5, 2007.

Using the HATS Bidirectional API, http://publib.boulder.ibm.com/infocenter/hatshelp/v60/topic/com.ibm.hat accessed Jul. 5, 2007.

Adapter Pattern, from Wikipedia, the free encyclopedia, http://en.wikipedia.org/wiki/Adapter_pattem accessed Nov. 28, 2007.

* cited by examiner

Object Container

Input Object

Command Data Structure

GENERATING FROM APPLICATION MODIFICATIONS COMMANDS TO MODIFY THE OBJECTS IN A REPOSITORY

BACKGROUND OF THE INVENTION

1. Field

The present invention relates to a method, system, and article of manufacture for generating from application modifications commands to modify the objects in a repository.

2. Description of the Related Art

Client applications may interface with heterogeneous data repositories via application adapters providing data exchange between the client applications and the heterogeneous data repositories. For instance, the client application may process data in a format that is not compatible with the format used by the target repository. In such case, the repository adapter may perform operations to transform requests and data from the client application to a format compatible with the target repository and vice versa.

In certain embodiments, the repository may store data in a hierarchical format. In such case, to exchange data between the repository and the client application, the adapter may process the client application request and compare with the data in the repository to determine the tasks to perform and generate the commands for the operations in the data repository. For instance, to perform an update operation to update a hierarchy of data objects in the repository, the adapter may retrieve the complete hierarchy from the repository and then compare the updates from the client application with the retrieved hierarchy of objects. Certain adapters may create delete command instances for objects that are present in the retrieved hierarchy but not subject to updates in the client application update request. These command instances will then be executed to delete the corresponding objects from the hierarchy of objects in the repository, thus removing objects not specified in the client update request.

There is a need in the art to provide improved techniques for interfacing between client application requests and a data repository.

SUMMARY

Provided are a method, system, and article of manufacture for generating from application modifications commands to modify the objects in a repository. An input object including an update to at least one of a plurality of objects in a repository object is received. At least one maintain property associated with at least one of the objects is received. The at least one maintain property indicates whether to maintain the at least one object associated with the maintain property in the repository object that is not indicated in the input object. A determination is made of an object in the repository object that are not indicated in the input object. For the determined object, the maintain property associated with the determined object is used to determine whether to maintain the determined object in the repository object.

DETAILED DESCRIPTION

Figure 1:
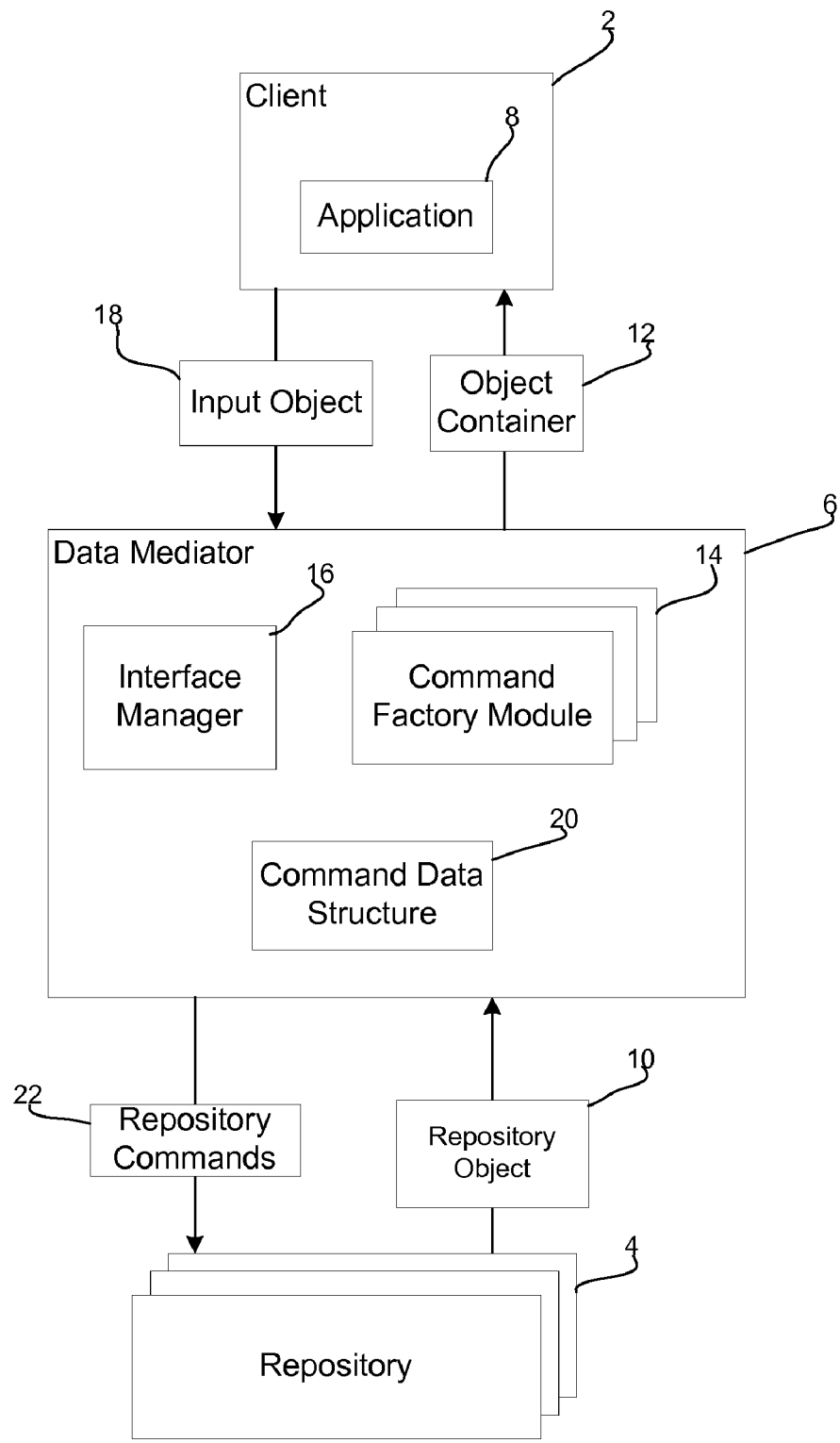
FIG. 1 illustrates an embodiment of a computing environment.

FIG. 1 illustrates a computing environment in which embodiments may be implemented. A client system 2 communicates with one or more data repositories 4 through a mediator 6. In response to a request from a client application 8 or other event, the data mediator 6 may be configured to retrieve data from the data repository 4 in the form of a repository object 10 to return to the application 8 in the form of an object container 12 compatible with the client application 8, which may include data objects represented in hierarchical relationships. The data mediator 6 may communicate with the data repository 4 using the repository's application program interfaces (API)s or other native interface and commands for communicating with external applications. In certain embodiments, the data mediator 6 may be implemented in an adapter the client system 2 uses to communicate with the data repositories 4. In alternative embodiments, the data mediator 6 may be implemented in other components external or internal to the client 2.

The data mediator 6 maintains a command factory module 14 for each different repository 4 with which the mediator 6 may interface, which may comprise repositories from different vendors or different types of repositories from a same vendor, such as a database, content manager, etc. Each command factory module 14 includes APIs specific to the repository 4 that the mediator 6 uses to communicate with that repository 4. The data mediator 6 includes an interface manager 16 program that determines the commands or APIs from a command factory module 14 to use to communicate with a requested repository 4. The interface manager 14 may convert hierarchical data in a repository object 10 received from the repository 4 into a format in the object container 12 compatible with the client application 8.

In embodiments where the object container 12 maintains the objects in a hierarchical relationship, the interface command manager 14 may organize hierarchical data from the repository object 10 into a series of individual data objects represented as nodes in a hierarchical data structure in the object container 12. The object container 12 may include a parent object in addition to one or more child objects, which may have further child objects. Thus, any object may have one or more ancestors and descendants at different levels of the hierarchy. Each object may contain a set of named attributes represented as primitive-type values or references to other related objects, such as immediate parents or children. In alternative embodiments, the objects in an object container 12 may not be maintained in a hierarchical relationship and may be related in manners other than hierarchical or not related.

The client application 8 may operate on the hierarchically arranged data in the object container 12 by altering or transforming the objects. The client application 8 may communicate modifications to the objects in the object container 12 through an input object 18. The input object 18 may reflect changes or updates to the object container 12 structure, objects and metadata contained therein. Changes or updates may include adding, deleting, and updating objects and/or their metadata.

The command factory module 14 analyzes the input object 18 and generates a command data structure 20 including native commands from the command factory module 14 for the target repository 4 to implement the client application 8 commands in the input object 18. The command data structure 20 may provide a hierarchical representation of the commands corresponding to the hierarchical arrangement of the objects for which the commands are provided. For instance, the commands in the command data structure 20 may be arranged into a series of nodes, including a parent node and one or more child nodes.

The interface manager 16 may execute the command data structure 20, such as updating, deleting, modifying, and adding objects to the container.

Figure 2:
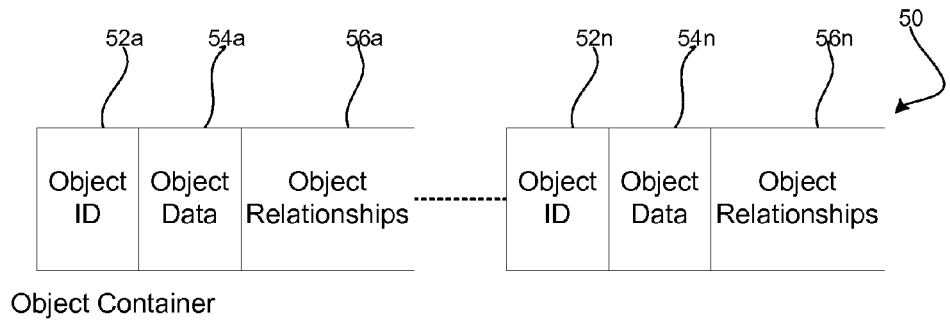
FIG. 2 illustrates an embodiment of an object container provided to the client application.

FIG. 2 illustrates an embodiment of the information included in an object container 50 compatible with the application 8 format, which may comprise an embodiment of the format of the object container 12 in FIG. 1. The object container 50 includes information for multiple objects, where for each object the information includes an object identifier (ID) 52a . . . 52n, which may comprise a unique ID of the object; the object data 54a . . . 54n; and object relationships 56a . . . 56n indicating parent and child objects of the object 52a . . . 52n. The object container 50 information may also include additional metadata for the container and objects therein.

Figure 3:
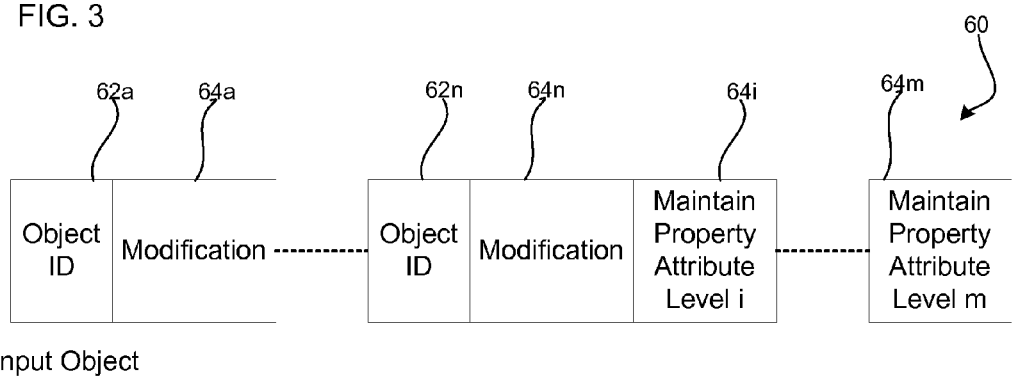
FIG. 3 illustrates an embodiment of an input object from the client application having modifications to objects in the repository.

FIG. 3 illustrates an embodiment of information included in an input object 60 from the application 8, which may comprise an embodiment of the information included in the input object 18 of FIG. 1. The input object 60 includes for each object the application 8 modifies an object identifier 62a . . . 62n providing the unique identifier of the object; a modification command 64a . . . 64n, such as add, delete, update, etc.; and a maintain property attribute 66i . . . 66m for all or less than all of the hierarchical levels represented in the object container 12. The maintain property attribute 66i . . . 66m indicates whether objects at a certain level in the hierarchy should be deleted from the repository object 10 in the repository 4 if the input object 18 does not provide modifications for the object. The modification commands 64a . . . 64n may also set attributes of the objects, such as permissions, read-only access, etc. The input object 18 may include commands for a subset of the total objects in the object container 12 that are modified. The modification commands 64a . . . 64n may be in a format compatible with the application 8, which may not be compatible with the command format of the repository 4.

Figure 4:
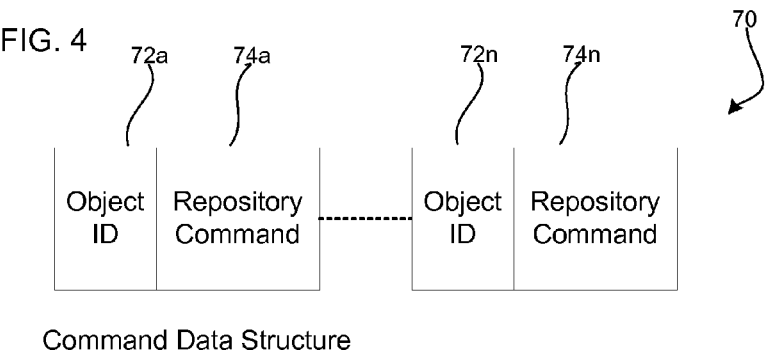
FIG. 4 illustrates an embodiment of a command data structure to apply client application modifies to a repository.

FIG. 4 illustrates an embodiment of information maintained in a command data structure 70, which may comprise an embodiment of the information included in the command data structure 20 in FIG. 1. The command data structure 70 includes for each object modified in the input object 18 an object identifier 72a . . . 72n providing the unique identifier of the object and a modification command 64a . . . 64n, such as add, delete, update, no operation, etc., in the format compatible with the repository 4 command set. In certain embodiments, the command data structure 70 may include an operation or "no operation" for each object in the repository object 10.

Figure 5:
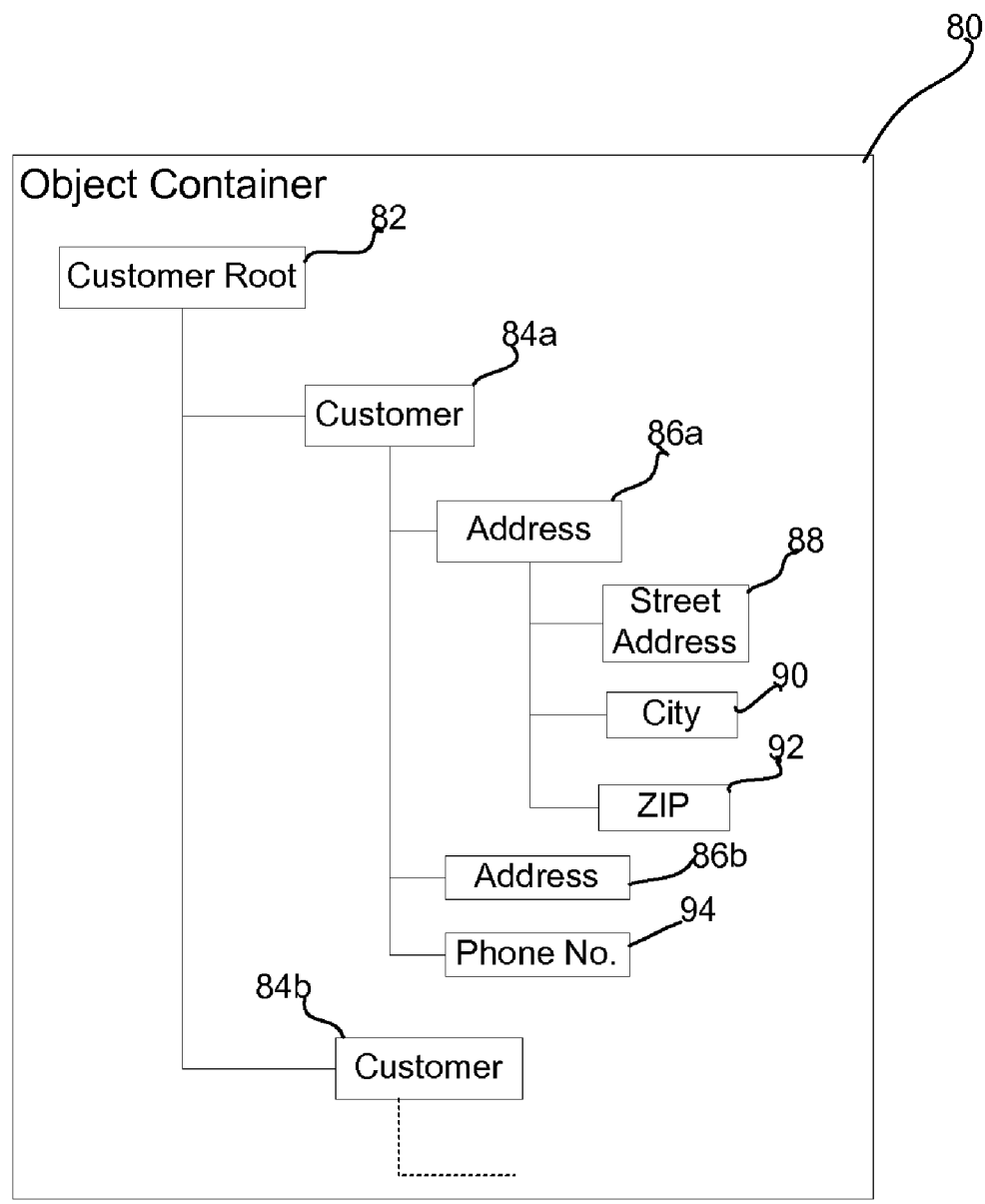
FIG. 5 illustrates an example of a hierarchical arrangement of objects in a container.

FIG. 5 illustrates an example of a hierarchical arrangement of objects which may be represented in a repository object 10 and an object container 12. The container 80 includes a customer root level 82 with one or more instances of customer objects 84a, 84b at a customer level in the hierarchy. An address level is a child to the customer level having address objects 86a, 86b with further child levels of street address objects 88, city 90, and zip code 92 objects providing further address information. A phone number object 94 may be at the same hierarchical level as the address objects 86a, 86b.

Figure 6:
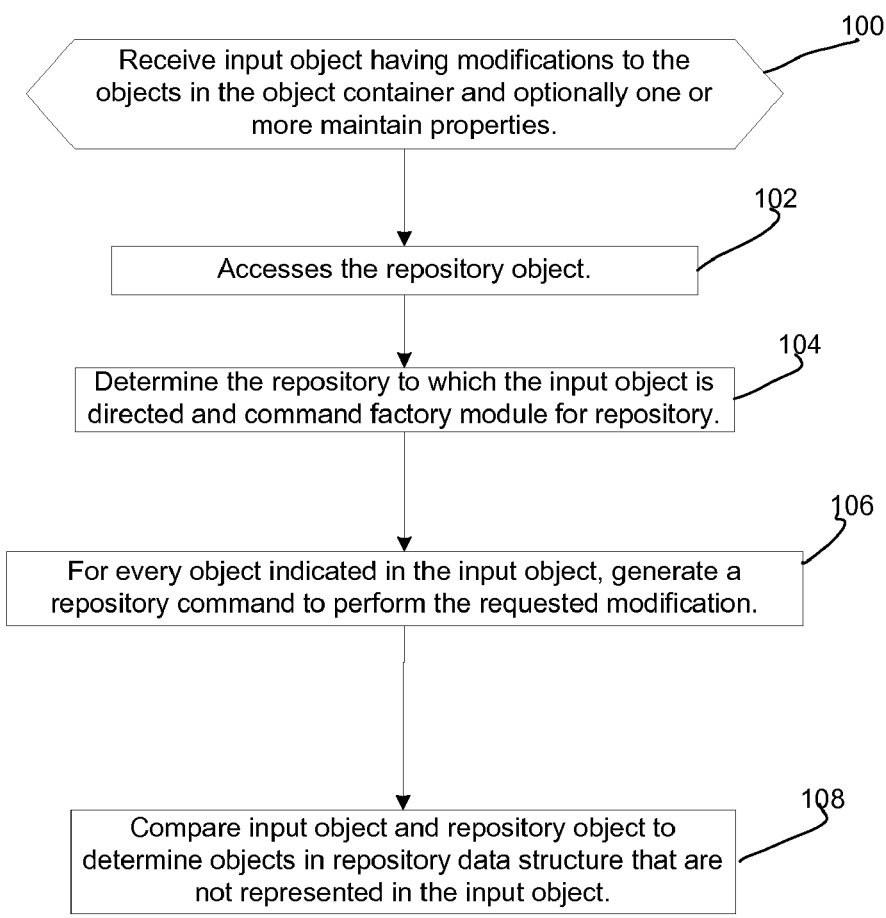
FIGS. 6 and 7 illustrate an embodiment of operations to generate a command data structure to modify a repository from client application object modifications.

FIG. 6 illustrates an embodiment of operations performed by the interface manager 16 to generate a command data structure 20 from an input object 18 provided by a client application 8. Upon receiving (at block 100) an input object 18 having modifications for objects in the object container 12 and optionally one or more maintain property attributes 64i . . . 64m for one or more hierarchical levels represented in the object container 12, the interface manager 16 accesses (at block 102) the repository object 10. This may be the instance of the repository object 10 previously transmitted or the interface manager 16 may access anew the repository 4. The interface manager 16 determines (at block 104) the repository 4 to which the input object 8 is directed and the command factory module 14 including the native command set for the determined repository 4. For each object indicated as modified in the input object 18, the command factory module 14 generates (at block 106) a repository 4 command, from the command set in the command factory module 14 for the repository 4, to perform the requested modification on the object. In one embodiment, if the generated command is a delete command, then the command factory module 14 may generate into the command data structure 20a delete command from the repository command set for every object that is a descendant of the object for which the delete command was generated.

The interface manager 16 compares (at block 108) the input object 18 and repository object 10 to determine objects in the repository object 10 that are not represented in the input object 18. With respect to FIG. 7, the interface manager 16 performs a loop of operations at blocks 114 through 126 for each object in the repository object 10 that is not represented in the input object 18. The interface manager 16 determines (at block 116) the maintain property 64i . . . 65m for the object being considered. In one embodiment, the maintain property for the object may comprise a maintain property for the level of the object in the hierarchy or for other groupings of objects. If (at block 118) the maintain property 64 . . . 64n for the object does not indicate to keep the object, or objects at the level for which the property is provided, then the command factory module 14 generates (at block 120) a "delete" command from the repository command set for the object into the command data structure 20. In further embodiments, the delete command may be generated if there is no maintain property attribute provided in the input object 18 or with the input object 18 for the object being considered. In certain embodiments, as discussed, the command factory module 14 may generate a delete command for every descendant of the object for which the delete command is generated.

If (at block 118) the maintain property attribute 64i . . . 64m for the object indicates to maintain the object and if (at block 120) the object has child objects, as indicated in the repository object 10, then the interface manager 16 generate (at block 124) a "no operation" command for the object into the command data structure 20 to instruct the repository 4 not to take any action with respect to the object. From block 120 or the no branch of block 124, control proceeds (at block 126) to loop back to block 114 to process any further objects in the repository object 10 not represented in the input object 18.

The interface manager 16 may further execute (at block 128) the repository commands in the command data structure 20.

With the described embodiments, a maintain property is used to indicate whether to delete an object from a repository if an input object from a client application does not provide any commands for the object, such as update or delete data or metadata. If the maintain property is provided, then the interface manager may generate a "no operation" command in the command data structure from the command set for the target repository indicating to not perform any operation with respect to the object.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). An "article of manufacture" comprises computer readable medium and/or hardware logic in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The variables "i", "m", and "n", etc. are used to denote integer instances of elements, and may indicate different or the same integer value when used with different references to the elements.

Figure 7:
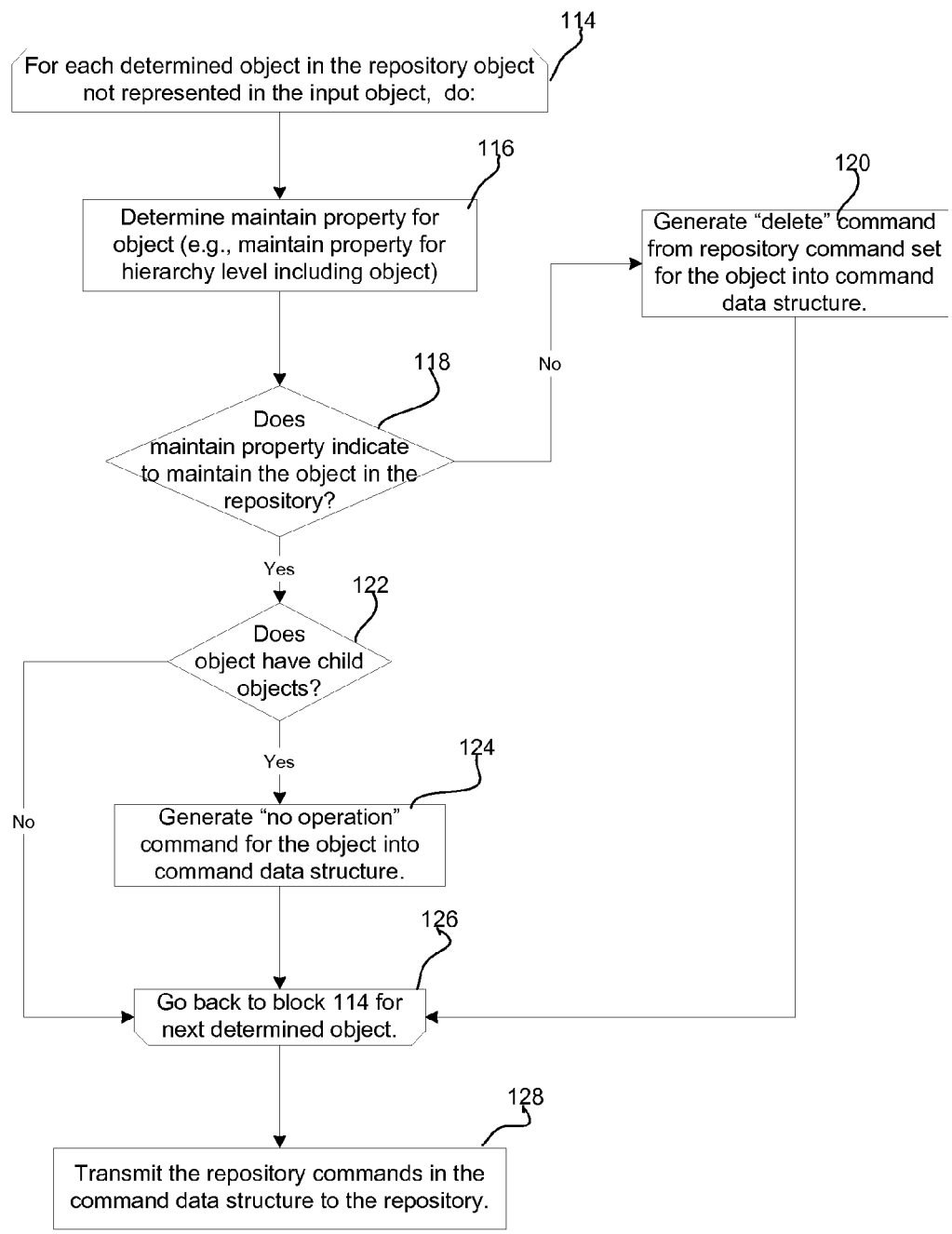

The illustrated operations of FIGS. 6 and 7 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving, by use of a processor, an input including an update to at least one of a plurality of objects organized in a plurality of hierarchical levels in a repository object from a repository;

receiving, from the repository, maintain properties associated with each hierarchical level, wherein each maintain property indicates whether to maintain an object of the hierarchical level associated with the maintain property in the repository object that is not indicated in the input object;

determining an object in the repository object that is not indicated in the input object;

for the determined object, determining whether the maintain property associated with the determined object indicates to maintain the object; and indicating to delete the determined object determined associated with the maintain property indicating to not maintain the object.

2. The method of claim 1, further comprising:

generating a modify command for each object updated by the input object; and generating a no operation command for the determined object associated with the maintain property indicating to maintain the object.

3. The method of claim 2, further comprising:

for the determined object associated with the maintain property indicating to maintain the object, determining whether the determined object has a child object, wherein the no operation command is generated for the determined object in response to determining that the determined object has the child object.

4. The method of claim 2, further comprising:
maintaining command sets for repositories having different command sets;
determining one of the repositories to which the input object is directed; and
determining the command set for the determined repository, wherein the generated commands are determined from the determined repository command set.

5. The method of claim 1, wherein the objects in the repository object are organized in groups of related objects and wherein there is one maintain property provided for each group indicating whether the objects in the group are to be maintained when the input object does not indicate to modify the objects in the group.

6. The method of claim 1, wherein a descendant level to an ancestor level comprises descendant objects to an ancestor object comprising one object in the ancestor level, and wherein one maintain property is provided for each level indicating whether the objects in the level are to be maintained when the input object does not indicate to modify the object.

7. The method of claim 6, wherein determining the objects in the repository object not modified in the input object comprise determining objects in the data structure in at least one level of the hierarchy that are not modified in the input object, and wherein using the maintain property comprises:
determining whether the maintain property for the at least one level having determined objects indicates to maintain the objects; and
generating a delete command into a command data structure for at least one of the determined objects associated with the maintain property that indicates to not maintain the objects.

8. The method of claim 7, further comprising:
generating a no operation command in the command data structure for at least one of the determined objects associated with the maintain property that indicates to maintain descendant objects of the at least one determined object associated with the maintain property.

9. The method of claim 7, further comprising:
executing commands in the command data structure to perform operations with respect to the objects in the data structure in the repository.

10. A system in communication with a repository having repository objects, comprising:
a computer readable medium storing code;
a data mediator comprising a processor coupled to a memory executing the code to cause operations comprising:
receiving an input object including an update to at least one of a plurality of objects organized in a plurality of hierarchical levels in a repository object from the repository;
receiving, from the repository, maintain properties associated with each hierarchical level, wherein each maintain property indicates whether to maintain an object of the hierarchical level associated with the maintain property in the repository object that is not indicated in the input object;
determining an object in the repository object that is not indicated in the input object;
for the determined object, determining whether the maintain property associated with the determined object indicates to maintain the object; and indicating to delete the determined object determined associated with the maintain property.

11. The system of claim 10, wherein the operations further comprise:
generating a modify command for each object updated by the input object; and
generating a no operation command for the determined object associated with the maintain property indicating to maintain the object.

12. The system of claim 11, wherein the operations further comprise:
for the determined object associated with the maintain property indicating to maintain the object, determining whether the determined object has a child object, wherein the no operation command is generated for the determined object in response to determining that the determined object has the child object.

13. The system of claim 11 further in communication with a plurality of repositories, wherein the operations further comprise:
maintaining command sets for the repositories having different command sets;
determining one of the repositories to which the input object is directed; and
determining the command set for the determined repository, wherein the generated commands are determined from the determined repository command set.

14. The system of claim 10, wherein the objects in the repository object are organized in groups of related objects and wherein there is one maintain property provided for each group indicating whether the objects in the group are to be maintained when the input object does not indicate to modify the objects in the group.

15. The system of claim 10, wherein a descendant level to an ancestor level comprises descendant objects to an ancestor object comprising one object in the ancestor level, and wherein one maintain property is provided for each level indicating whether the objects in the level are to be maintained when the input object does not indicate to modify the object.

16. The system of claim 15, wherein determining the objects in the repository object not modified in the input object comprise determining objects in the data structure in at least one level of the hierarchy that are not modified in the input object, and wherein using the maintain property comprises:
determining whether the maintain property for the at least one level having determined objects indicates to maintain the objects; and
generating a delete command into a command data structure for at least one of the determined objects associated with the maintain property that indicates to not maintain the objects.

17. The system of claim 16, wherein the operations further comprise:
generating a no operation command in the command data structure for at least one of the determined objects associated with the maintain property that indicates to maintain descendant objects of the at least one determined object associated with the maintain property.

18. The system of claim 16, wherein the operations further comprise:
executing commands in the command data structure to perform operations with respect to the objects in the data structure in the repository.

19. An article of manufacture comprising a computer readable medium storing code executed by a processor to cause operations comprising:

receiving an input object including an update to at least one of a plurality of objects organized in a plurality of hierarchical levels in a repository object from the repository;

receiving, from the repository, maintain properties associated with each hierarchical level, wherein each maintain property indicates whether to maintain an object of the hierarchical level associated with the maintain property in the repository object that is not indicated in the input object;

determining an object in the repository object that is not indicated in the input object;

for the determined object, determining whether the maintain property associated with the determined object indicates to maintain the object; and indicating to delete the determined object determined associated with the maintain property.

20. The article of manufacture of claim 19, wherein the operations further comprise:

generating a modify command for each object updated by the input object; and generating a no operation command for the determined objects associated with the maintain property indicating to maintain the object.

21. The article of manufacture of claim 20, wherein the operations further comprise:

for the determined object associated with the maintain property indicating to maintain the object, determining whether the determined object has a child object, wherein the no operation command is generated for the determined object in response to determining that the determined object has the child object.

22. The article of manufacture of claim 20, wherein the operations further comprise:

maintaining command sets for repositories having different command sets; determining one of the repositories to which the input object is directed; and determining the command set for the determined repository, wherein the generated commands are determined from the determined repository command set.

23. The article of manufacture of claim 19, wherein the objects in the repository object are organized in groups of related objects and wherein there is one maintain property provided for each group indicating whether the objects in the group are to be maintained when the input object does not indicate to modify the object in the group.

24. The article of manufacture of claim 19, wherein a descendant level to an ancestor level comprises descendant objects to an ancestor object comprising one object in the ancestor level, and wherein one maintain property is provided for each level indicating whether the objects in the level are to be maintained when the input object does not indicate to modify the object.

25. The article of manufacture of claim 24, wherein determining the objects in the repository object not modified in the input object comprise determining objects in the data structure in at least one level of the hierarchy that are not modified in the input object, and wherein using the maintain property comprises:

determining whether the maintain property for the at least one level having determined objects indicates to maintain the objects; and generating a delete command into a command data structure for at least one of the determined objects associated with the maintain property that indicates to not maintain the objects.

26. The article of manufacture of claim 25, wherein the operations further comprise:

generating a no operation command in the command data structure for at least one of the determined objects associated with the maintain property that indicates to maintain descendant objects of the at least one determined object associated with the maintain property.

27. The article of manufacture of claim 25, wherein the operations further comprise:

executing commands in the command data structure to perform operations with respect to the objects in the data structure in the repository.

* * * * *